US009332146B2

(12) United States Patent
Tao et al.

(10) Patent No.: US 9,332,146 B2
(45) Date of Patent: May 3, 2016

(54) LID POSITION DETECTOR FOR AN IMAGE SCANNER

(71) Applicant: Hewlett-Packard Development Company, L.P., Houston, TX (US)

(72) Inventors: Qian Tao, Singapore (SG); Jang Wei Chao, Singapore (SG)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/952,052

(22) Filed: Jul. 26, 2013

(65) Prior Publication Data

US 2015/0029563 A1 Jan. 29, 2015

(51) Int. Cl.
*H04N 1/04* (2006.01)
*H04N 1/00* (2006.01)

(52) U.S. Cl.
CPC ....... *H04N 1/00771* (2013.01); *H04N 1/00554* (2013.01); *H04N 1/00557* (2013.01); *H04N 1/00835* (2013.01)

(58) Field of Classification Search
CPC .............. H04N 2201/0081; H04N 2201/0422; H04N 1/0051; H04N 1/00588; H04N 1/00681; H04N 1/00018; H04N 1/0473; H04N 1/00732; H04N 1/00734; H04N 1/00737
USPC .................................................. 358/498, 474
See application file for complete search history.

(56) References Cited

U.S. PATENT DOCUMENTS

| | | | |
|---|---|---|---|
| 7,139,108 B2 | 11/2006 | Andersen et al. | |
| 2004/0070798 A1* | 4/2004 | Andersen et al. | 358/498 |
| 2006/0170987 A1* | 8/2006 | Ho | 358/474 |
| 2007/0109614 A1* | 5/2007 | Iwago et al. | 358/498 |
| 2010/0020362 A1* | 1/2010 | Suzuki | 358/498 |
| 2010/0053706 A1 | 3/2010 | Jasinski et al. | |
| 2011/0211237 A1* | 9/2011 | Osakabe | 358/498 |
| 2012/0187186 A1 | 7/2012 | Wu et al. | |
| 2012/0243054 A1 | 9/2012 | Sellers | |
| 2012/0250108 A1* | 10/2012 | Wilsher et al. | 358/474 |
| 2012/0279954 A1 | 11/2012 | Ceremony et al. | |
| 2013/0044357 A1* | 2/2013 | Igawa et al. | 358/474 |
| 2013/0083376 A1* | 4/2013 | Miura et al. | 358/498 |
| 2013/0322894 A1* | 12/2013 | Ishida et al. | 399/21 |
| 2014/0009805 A1* | 1/2014 | Matsumi | 358/509 |

OTHER PUBLICATIONS

English Machine Translation of JP 2004-258386-A (Ishido, Published Sep. 16, 2004).*
Mukhtar, M., et al., "Iterative Learning Based Repetitive Disturbance Rejection with Application to Color Registration Error Reduction in Flatbed Document Scanners", 2009 IEEE/ASME International Conference on Advanced Intelligent Mechatronics, pp. 1330-1335, Jul. 14-17,2009.

* cited by examiner

*Primary Examiner* — Eric A Rust
*Assistant Examiner* — Juan M Guillermety
(74) *Attorney, Agent, or Firm* — HP Inc.,—Patent Department

(57) ABSTRACT

An image scanner includes a main body and a lid. The main body includes a scan window. The scan window is covered by the lid when the lid is closed and is exposed when the lid is open. A lid position detector detects whether the lid is open or closed.

14 Claims, 10 Drawing Sheets

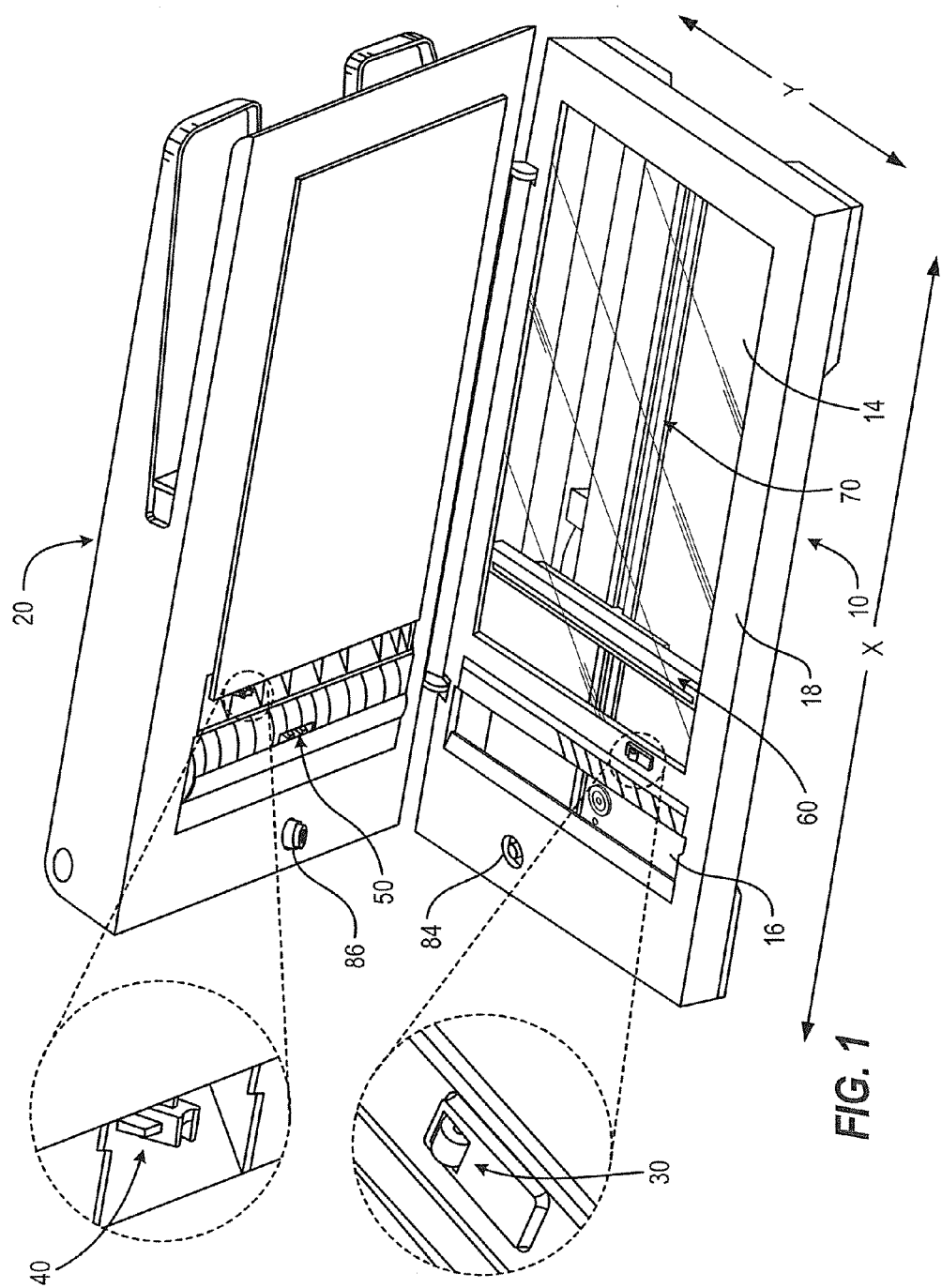

LID POSITION DETECTOR FOR AN IMAGE SCANNER

BACKGROUND

Image scanners are apparatus which image a sheet of paper, sheet of other material, document, book or other object with a light source and sense a resultant light signal with an optical sensor. The sensed image may be stored, processed, printed or sent to another apparatus etc.

Image scanners include scanners, photocopiers, fax machines and multi-function devices. A multi-function device is a device which may perform more than one function such as scanning, faxing, photocopying or printing etc.

Image scanners may include an Automatic Document Feeder (ADF) for automatically loading and unloading single sheets sequentially to a station where the apparatus performs an operation. E.g. sequentially scanning, photocopying, faxing, displaying on a computer screen, printing etc. The ADF may be included in a lid of the image scanner.

BRIEF DESCRIPTION OF THE DRAWINGS

Examples of the invention will now be described, by way of non-limiting example only, with reference to the accompanying drawings, in which:

FIG. 1 shows an example of an image scanner in perspective view;

DETAILED DESCRIPTION

FIG. 1 shows a perspective view of an image scanner. The image scanner 1 comprises a main body 10 which includes a flatbed scan window 14 made of transparent material. A sheet of paper, book, document or other object to be scanned may be placed on the flatbed scan window 14.

Figure 2A:
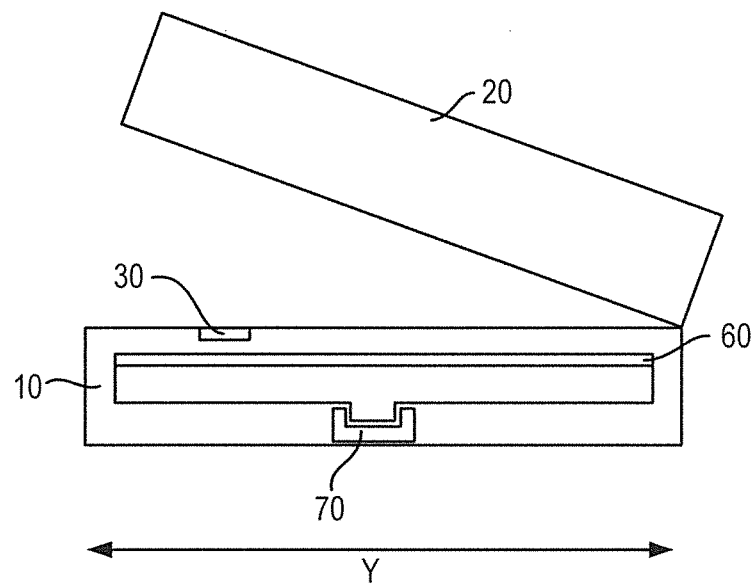
FIG. 2A shows a schematic example of an image scanner from the side with the lid open.
Figure 2B:
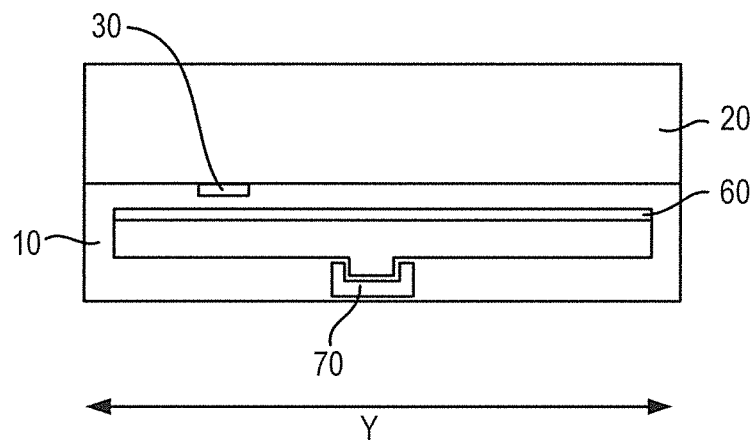
FIG. 2B shows a schematic example of an image scanner from the side with the lid closed.

The image scanner also includes a lid 20 which is capable of adopting an open position and a closed position. When the lid is in the open position, as shown in FIG. 1, the scan window 14 is exposed and a sheet of paper or other material, book, document or other object may be placed on the scan window for scanning. FIG. 2A is a schematic side view of the image scanner with the lid in an open position. FIG. 2B is a schematic side view of the image scanner with the lid 20 in the closed position. When the lid is in a closed position, it covers the scan window 14. The lid 20 is movable between the open and closed positions shown in FIGS. 2A and 2B. The lid may for example have a hinge or other mechanical connection to the main body which allows movement between the open and closed positions.

In the illustrated example, the lid 20 includes an Automatic Document Feeder (ADF) for receiving sheets of paper or another medium and feeding them sequentially to a scanning position, as will be discussed in more detail later. In other examples the lid 20 may not include an ADF and may for instance be a simple panel lid for covering the scan window 14. If the lid 20 does not include an ADF, then an ADF may be positioned elsewhere, or the image scanner may have no ADF. The present disclosure includes both image scanners with an ADF and image scanners with no ADF.

The image scanner may have a scanning module 60 to scan an object placed on the scanning window 14. The scanning module may scan by moving from one side of the scan window 14 to the other, e.g. along the axis X shown in FIGS. 1 and 3. The same scanning module, or a different scanning module, may be used to scan a sheet fed through the ADF.

For various reasons it can be useful for the image scanner to be able to detect whether the lid 20 is open or closed. The image scanner may attempt to determine if the lid is closed from the level of ambient light, e.g. if the scanning module or another detector detects a high level of ambient light then it is determined that the lid is open, but if a low level of ambient light is detected then it is determined that the lid is closed. However, this is not always accurate. For example, a low level of ambient light may simply indicate that the image scanner is placed under a desk, or in a dark office, rather than that the lid is closed.

Accordingly, in one example of the present disclosure the image scanner has a lid position detector 30 to detect whether the lid is open or closed. In one example the lid position detector 30 includes a mechanical flag which adopts a first position when the lid is open and a second position when the lid is closed. In one example the mechanical flag may be actuated by an actuator 40 in the lid of the image scanner. As the flag is mechanical it does not depend upon a level of ambient light and the position of the flag may be detected to determine whether the lid is open or closed. In one example the position of the mechanical flag is detected by an optical sensor.

The image scanner may use information as to whether the lid is open or closed to guide other operations of the image scanner, such as whether a scan job may be commenced or to cause an image scanning module to be moved to a particular position, such as a start position at which it can start scanning. In one example the lid position detector may be used in combination with an ADF sheet detector to prevent a false ADF jam message, as will be explained in more detail later.

Examples of a lid position detector including a mechanical flag will be described in more detail later. First, other features of the image scanner will be described by way of example.

Figure 3:
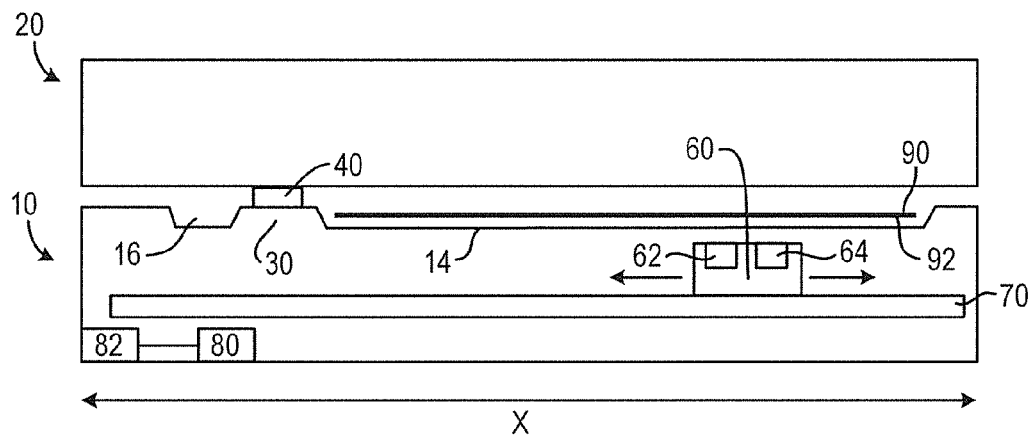
FIG. 3 shows a schematic example of an image scanner from the front.

FIG. 3 is a schematic view of the image scanner as seem from the front. In FIG. 3 an object 90 is placed on the scanning window 14. The object 90 may for example be a sheet of paper, sheet of other material, document, picture, book or other object. In the example of FIG. 3, the lid 20 is a simple lid and does not include an ADF. The image scanner includes an image scanning module 60 which may be positioned beneath the scan window 14. The image scanning module is to scan a downward facing side 92 of object 90 which is placed on the scan window 14.

The image scanning module 60 may include a light source 62 and an image sensor 64. The light source 62 may be a lamp or another source for emitting visible light, or other forms of light such as infrared light or ultraviolet light. The image sensor 64 may be an optical sensor such as a CCD (charge coupled device), a CIS (contact image sensor), infrared or ultraviolet light sensor etc. Light is directed from the light source 62 to a face 92 of the object which is to be scanned. The face 92 of the object reflects light from the light source and the reflected light is sensed by the image sensor 64. The reflected light will have variations due to any pattern, writing, texture or picture etc on the surface of the object being scanned and these variations are detected by the image sensor 64. The image sensor may use these variations in light to build up an image of the object which may be stored in a memory of the image scanner and/or sent to an external device. The image scanner may also have optics such as mirrors and lenses to direct the light from the light source 62 to the object to be scanned and direct the reflected light to the image sensor 64.

The scanning module 60 may for example extend along a width of the scanning window along axis Y (see FIG. 1) and may be movable along an axis X with respect to the scanning window 14. By moving along the axis X the scanning module 60 can build up an image of the face 92 of the object 90. In the illustrated example both the light source 62 and the image sensor 64 are on the same unit 60 and movable relative to the scanning window 14. In other examples, the light source 62 may be stationary, while the image sensor is movable, or the image sensor may be stationary while the light source is movable, or the scanning may be achieved by moving the optics while one or both of the image sensor and light source remain stationary.

The scanning module 60 may be associated with a guide 70 for supporting and/or guiding movement of the scanning module relative to the scanning window 14. The guide 70 comprises one or more structures for guiding movement of the scanning module 60. For example, the guide 70 may comprise a groove which a portion of the scanning module interfaces with and slides along, or the guide may include a projection, rail or rod etc which interfaces with a structure on the scanning module 60.

The image scanner also includes a controller 80 which controls the scanning module 60. For instance the controller may control a motor 82 that drives movement of the scanning module. The controller may also control operation of the light source 62, image sensor 64 and associated optics. The controller 80 has a control line to the motor 82 and both the controller 80 and motor 82 may have a connection to the image scanning module 60 (connections to the image scanning module 60 are not shown in FIG. 3 for clarity). The controller 80 may receive a signal or data from the image sensor and process the signal or data, and/or send it to an external device. The controller 80 may include a memory and a processor to execute machine readable instructions stored in the memory. The memory may for instance be a flash memory, RAM, ROM, EEPROM etc. While the controller 80 is shown as a single component in FIG. 3, it may be distributed across several components.

Figure 4:
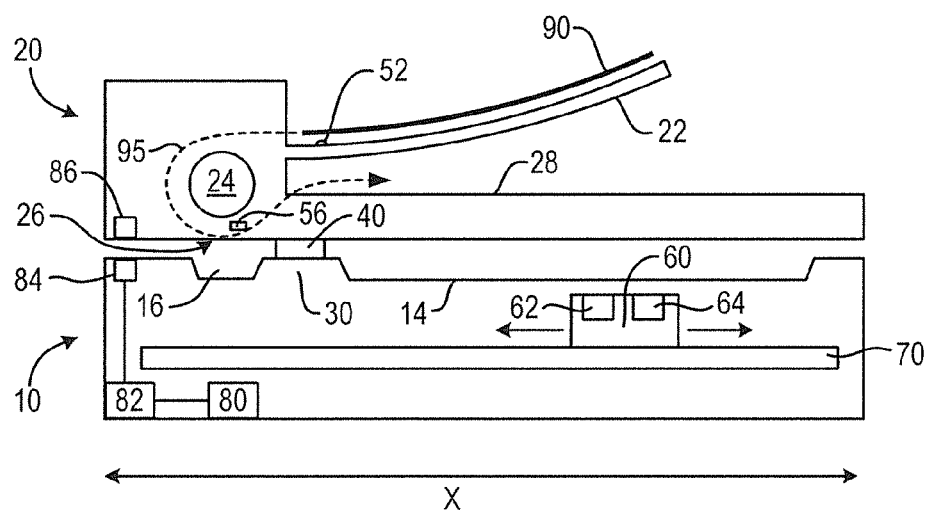
FIG. 4 shows a schematic example of an image scanner including an ADF as seen from the front.

An example of operation of an ADF will now be described with reference to FIG. 4. FIG. 4 is similar to FIG. 3 showing an image scanner with the lid closed. However, it differs from FIG. 3 in that the lid includes an ADF and in that in the illustrated example no objects are placed on the scan window 14. The ADF 20 may include a receiving station 22 for receiving sheets of paper 90, or sheet of another medium, which are to be fed through the ADF. For example the receiving station 22 may be a paper input tray. The ADF may further include a document feeding mechanism 24, such as a roller, configured to feed single sheets through the ADF, past a scanning position 26 to an output station 28. A sheet passing through the ADF may be scanned as it passes the scanning position 26. Sheets which have passed through the ADF are collected at the output station 28. An arrow 95 shows the direction of movement of a sheet through the ADF. The scanning of a sheet 90 at the scanning position 26 may be carried out by the same scanning module 60 which scans objects placed on the flatbed scan window. Using the same scanning module 60 to scan both objects placed on the flatbed scan window 14 and sheets fed through the ADF saves cost by reducing the number of scanning devices needed by the image scanner.

The document feeding mechanism may, in one example, be driven by the same motor 82 which drives movement of the image scanning module 60. For instance drive transmission parts 84 and 86 may be placed on the main body 10 and ADF lid 20 respectively to facilitate transmission of motor drive, as shown in FIGS. 1 and 4.

In the illustrated example the image scanner has two separate scanning windows: a flat bed scanning window 14 for receiving documents placed flat down in the scanner and a separate ADF scanning window 16 through which sheets fed through the ADF may be scanned. The ADF scanning window 16 is opposite the scanning position 26. In other examples, the image scanner does not have a separate ADF scanning window and the scanning position 26 of the ADF may be opposite a particular portion of the flatbed scanning window 14. In either case, in order to perform an ADF scanning operation, the scanning module 60 may move to the scanning position 26 and remain stationary to scan the sheet 90, as the sheet 90 is fed through the ADF and passes the scanning position 26.

In other examples, a document on the scanning window 14 is scanned by a first scanning module 60, while a sheet passing through the ADF is scanned by a separate scanning module (not shown). For instance, a separate second scanning module for scanning a sheet passing through the ADF may be provided in the ADF itself, or in the main body of the scanner.

It can be helpful for the image scanner to be able to determine whether a sheet is in the ADF. An ADF sheet detector may be provided to detect this. In one example, which is described in more detail with reference to FIG. 9, the ADF sheet detector may comprise an ADF sheet flag including a tab portion 52 which projects into the ADF receiving station 22 and a sensed portion 56 which may be detected by the image scanning module 60 or another device.

It can be helpful for the image scanner to be able to determine whether the lid 20 is open or closed. This information may for example be used by the image scanner to determine whether a scanning operation can be performed, to move an image scanning module to a start position at which it can start scanning, or to help prevent an ADF jam message.

Examples of a lid position detector and methods of detecting whether the lid is open or closed will now be described in more detail with reference to FIGS. 5A, 5B, 6A, 6B, 7A, 7B, 8A and 8B.

Figure 5A:
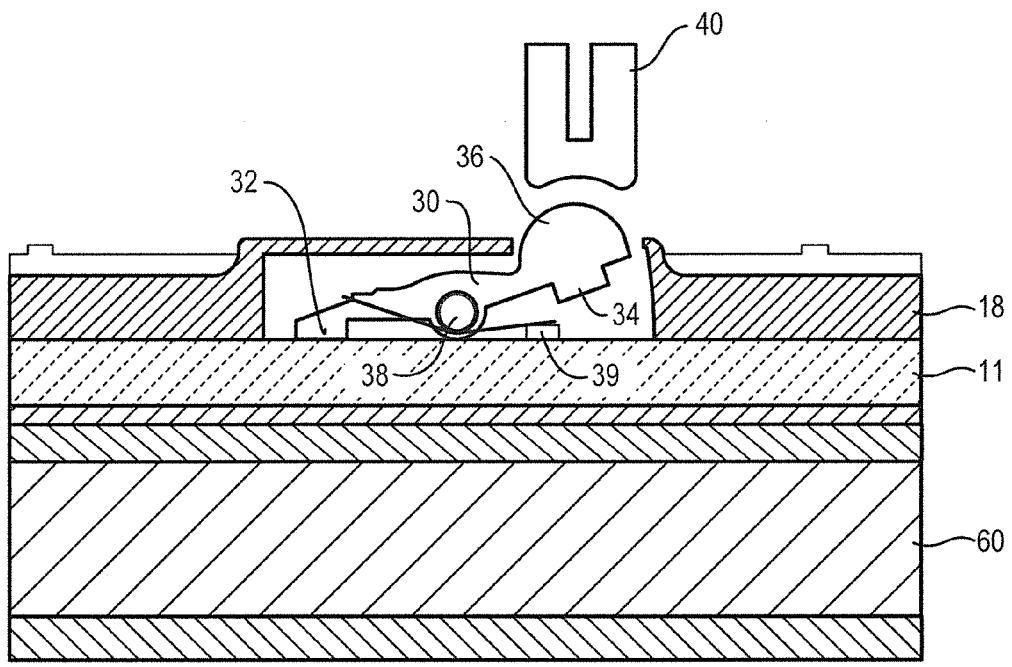
FIG. 5A shows an example of a mechanical flag in a first position.
Figure 5B:
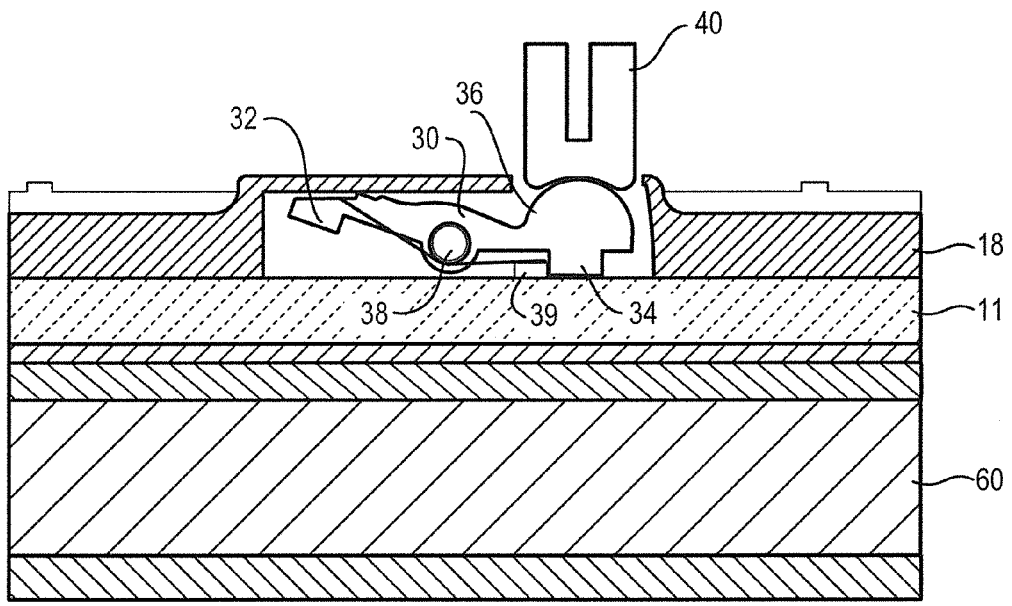
FIG. 5B shows an example of a mechanical flag in a second position.

FIGS. 5A and 5B show an example of a mechanical flag 30 which acts as a lid position detector. The mechanical flag 30 may be positioned in the main body 10 of the image scanner. It is movable between a first position, which it adopts when the image scanner lid 20 is open, and a second position which it adopts when the lid 20 is closed. FIG. 5A shows the mechanical flag 30 in the first position (lid open). FIG. 5B shows the mechanical flag 30 in the second position (lid closed).

The flag 30 may be moved between the first and second positions by an actuator 40. For instance, an actuator 40 may project from a lid 20 of the image scanner. The actuator 40 may mechanically actuate the flag 30 to move from the first to the second position. In one example, when the lid is closed the actuator 40 may contact an interface portion 36 of the mechanical flag 30 and push the flag downwards so that the flag moves to the second position.

In the example of FIGS. 5A and 5B, the mechanical flag 30 is pivotable about pivot point 38 to move between the first and second positions. In other examples the mechanical flag may move laterally or horizontally between a first and second position without pivoting. The mechanical flag may be biased into the first position by a torsion spring or other spring. In this case the flag adopts the first position, except when an actuator 40 or other force moves it to the second position when the lid closed.

The position of the mechanical flag 30 may be detected by an optical sensor or an electrical detector etc. For example, when the mechanical flag moves from the first position to the second position it may complete or break an electric circuit, or change the state of an optical switch. In another example the position of the mechanical flag may be detected by an image scanning module. As the position of the lid is determined based on a position of a mechanical flag, the determination may be independent of the level of ambient light.

As mentioned above, an image scanning module may scan the mechanical flag 30 to detect its position. If the same image scanning module 60 is used to scan the mechanical flag 30 as to scan an object in the scan window 14 and/or to scan a sheet fed through the ADF, then cost may be saved as fewer components are required compared to the case where a separate electrical or optical device is used to detect the lid position.

For example, in FIGS. 5A and 5B the mechanical flag 30 is positioned over a transparent position flag window 11 and a scanning module 60 beneath the window detects the position of the mechanical flag 30 by scanning it. For example the scanning module 60 may move to a position directly beneath the mechanical flag 30 in order to scan it and determine whether the lid is open or closed.

The position flag window 11, flat bed window 14 and ADF scan window 16 may be separate windows or different parts of the same window. In the example of FIG. 1 the windows are separated from each other by a bezel 18, but formed of the same piece of transparent material. The lid position flag window 11 cannot be seen in FIG. 1, as it is directly beneath the mechanical flag 30 and covered by the bezel 18. In other examples the windows 11, 14 and 16 may be formed from different pieces of transparent material. A single scanning module 60 may be used to scan an object on the flatbed scan window 14, a sheet in the ADF and the mechanical flag 30. The controller 80 may control the position of the scanning module 60 and/or associated optics such that the image scanning module scans the lid position flag 30, the ADF or the flatbed window.

The position of the mechanical flag 30 may be determined by scanning it. For example, in FIGS. 5A and 5B, the mechanical flag 30 has a first leg 32 and a second leg 34. Thus in FIG. 5A the mechanical flag is in its first position and the first leg 32 is in contact with the transparent window 11. In FIG. 5B, the flag is in its second position and the second leg 32 is in contact with the transparent window 11. The scanning module is thus able to detect whether the mechanical flag is in the first or second position by scanning the mechanical flag 30 and determining from the scan whether the first or second leg is in contact with the flag scanning window 11. A marker 39 may be used for calibration of the image scanning module before the flag 30 is scanned.

Figure 6A:
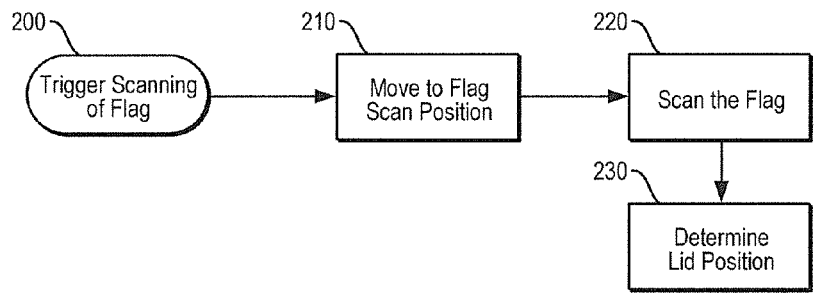
FIG. 6A is a flow diagram of an example method of determining a lid position.

An example method for determining the lid position is shown in FIG. 6A. At block 200 the controller 80 triggers scanning of the mechanical flag 30. For example this may be triggered in order to confirm whether or not the lid 20 is closed.

At block 210, if it is not already in position, the image scanning module 60 moves to a position underneath the mechanical flag 30 so that it can scan the flag 30.

At block 220 the scanning module scans the mechanical flag 30. In the illustrated example it is able to scan the mechanical flag 30 without moving as the mechanical flag sits within a scan line of the scanning module.

At block 230 the scanning module (or its controller) determines the position of the lid based on the scanned image of the mechanical flag 30 which was obtained at block 220.

Figure 6B:
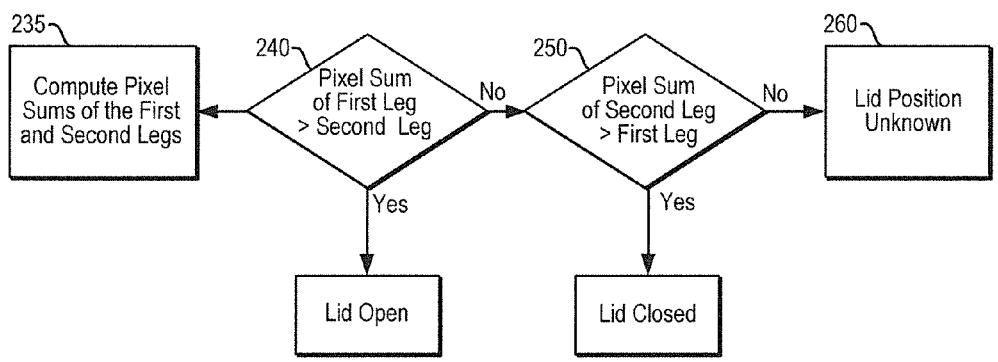
FIG. 6B is a flow diagram of an example method of determining a lid position.

FIG. 6B shows one example of how the image scanning module 60 or controller 80 may determine position of the lid based on the scanned image of the mechanical flag 30.

At block 235 the controller or scanning module computes a pixel sum of the mechanical flag's first leg 32 and second leg 34 in the scanned image.

At block 240 if the pixel sum of the first leg 32 is larger than the pixel sum of the second leg 34, then it is determined that the mechanical flag is in the first position and the lid 20 is open. For example, if the first leg 32 is in contact with the scan window 11, then the second leg 32 is not in contact with the scan window, thus only the first leg 32 will appear in the scanned image and its pixel sum will be larger than the pixel sum of the second leg 34.

At block 250 it is determined if the pixel sum of the second leg is greater than the pixel sum of the first leg. For instance if the second leg 34 is in contact with the scan window 11, then the first leg 32 is not in contact with the scan window. Thus only the second leg 32 will appear in the scanned image. In this case it is determined that the lid 20 is closed.

At block 260, if the pixel sum of the legs cannot be determined, or is equal, then the position of the lid 20 cannot be determined. This is most likely due to an error and the controller 80 may take appropriate action such as re-attempting the scan or generating an error message.

In other examples the determination of the lid position may be based on a single comparison of the pixel sum of first and second legs. For instance if the first leg pixel sum is greater than the second leg pixel sum then the lid is determined to be open, otherwise it is determined to be closed.

Figure 7A:
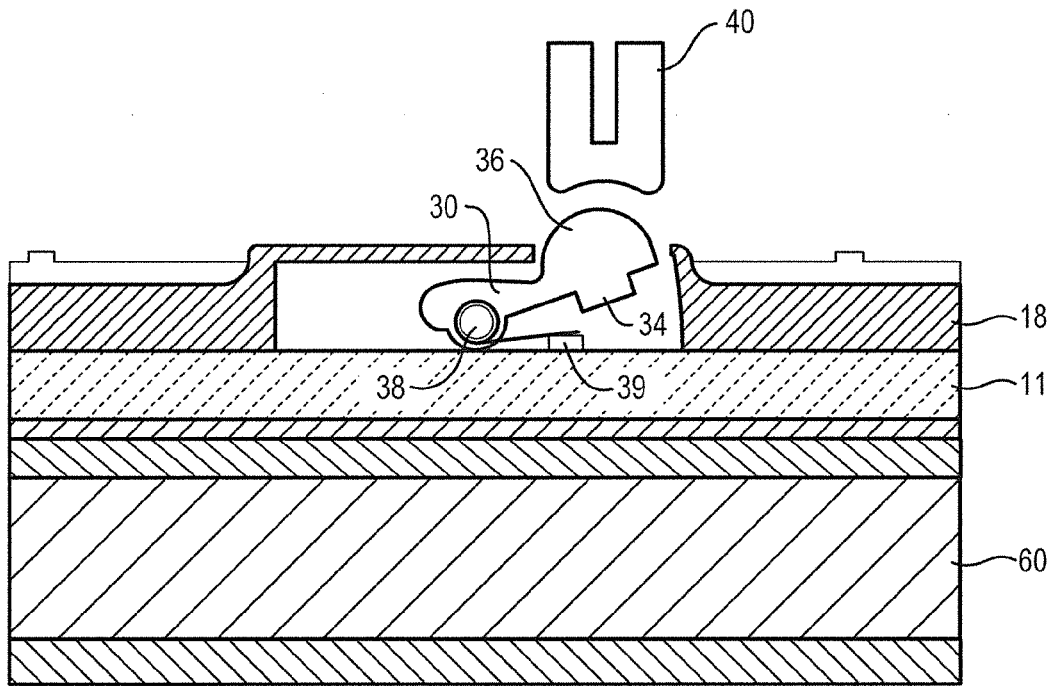
FIG. 7A shows an example of a mechanical flag in a first position.
Figure 7B:
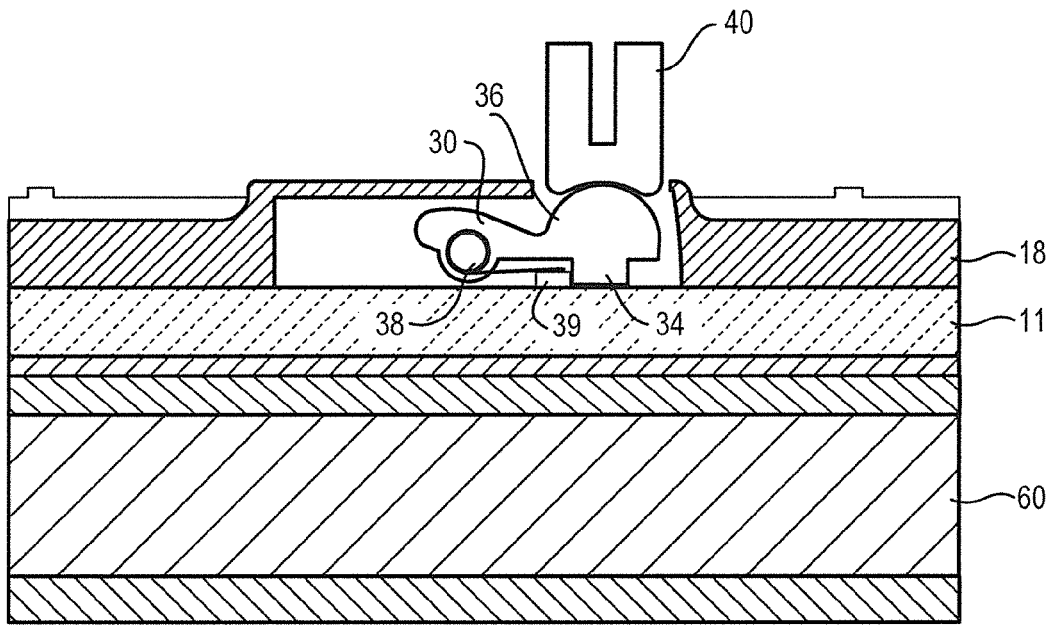
FIG. 7B shows an example of a mechanical flag in a second position.

In still other examples the determination of lid position may be made based on the presence or absence of a single leg in the scanned image of the flag. For instance FIGS. 7A and 7B show a variation on FIGS. 5A and 5B. The mechanical flag in FIGS. 7A and 7B is similar to FIGS. 5A and 5B, except that it only has one leg 34 that contacts the transparent window. Thus if the image scanned by the scanning module 60 shows presence of the leg 34 the lid is determined to be closed, otherwise it is determined to be open.

Figure 8A:
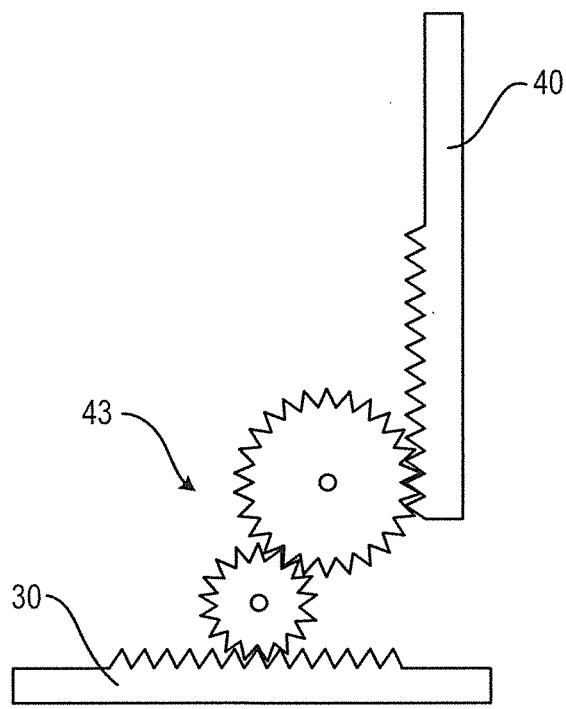
FIG. 8A shows an example of a mechanical flag in a first position.
Figure 8B:
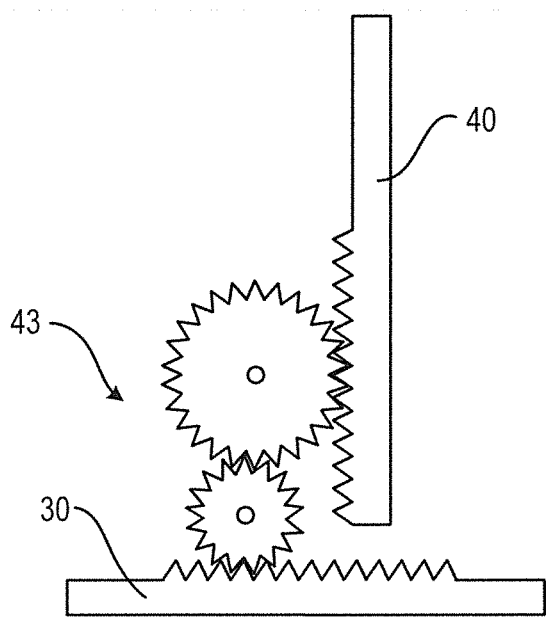
FIG. 8B shows an example of a mechanical flag in a second position.

In other examples the determination of lid position may be made on the basis of a position of the flag profile in the scanned image. For example FIGS. 8A and 8B show another example of a mechanical lid position flag 30 which moves laterally between the first and second positions when the lid is opened and closed. In this example the actuator 40 drives a rack and cog arrangement 43 to move the flag 30 from a first position shown in FIG. 8A when the lid is open to a second position shown in FIG. 8B when the lid is closed. As the scanned image of the flag 30 will be in different positions depending on whether the lid is open or closed the controller is able to determine the position of the lid by comparing the scanned position of the flag with an expected position when the lid is open or closed.

The controller 80 may use the determination as to whether the lid 20 is open or closed to guide operation of the image scanner. For example, the controller may be configured not to initiate scanning of an object in the scan window 14 unless the lid 20 has been closed. If the lid was open and is subsequently closed, this may indicate that a user has just placed a document on the scan window 14. Accordingly the controller may move the scanning module 60 to a start position (e.g. at one end of the scan window 14).

If the image scanner includes an ADF, then the image scanner may perform a flatbed scan or an ADF scan. A flatbed scan is a scan operation to scan an object placed face down on the flatbed scan window 14. An ADF scan is a scan operation to scan a sheet fed through the ADF. Whether the image scanner performs a flatbed or ADF scan may be determined in accordance with a user selection, or based on predetermined criteria. For example, the image scanner may have an ADF sheet detector to detect whether any sheets are present in the ADF. If the controller determines that the lid 20 is closed and that a sheet is in the ADF, then the controller may control the image scanner to scan a sheet from the ADF, rather than performing a flatbed scan, when a scan operation is instructed by the user.

Figure 9:
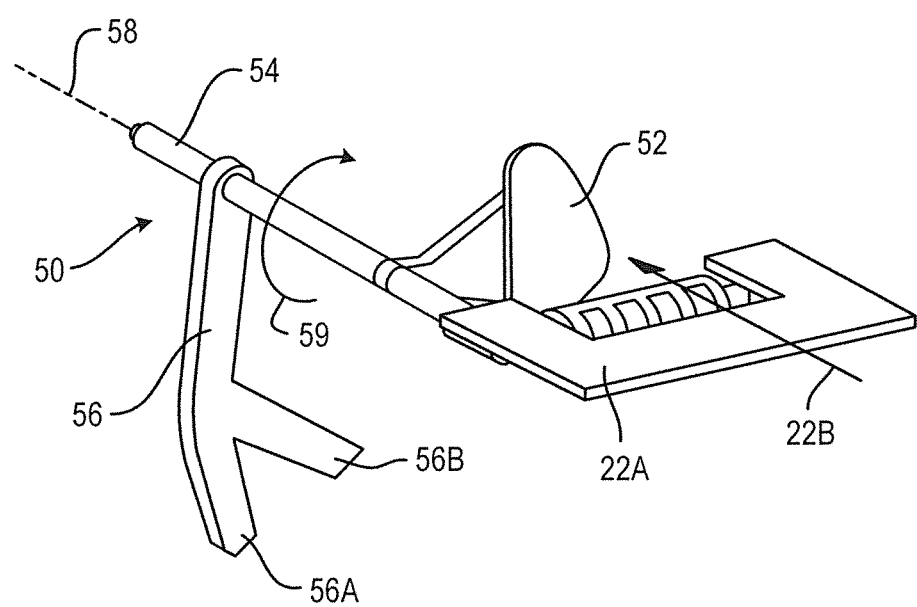
FIG. 9 shows an ADF sheet flag and an actuator.

There are various ways in which the image scanner may detect the presence of a sheet in the ADF. For example, the ADF sheet detector may include an electrical or optical switch which is switched on or off by presence of a sheet in the ADF. In another example the presence of a sheet in the ADF may be detected by an optical device in the main body of the scanner. For instance, the ADF sheet detector may include a mechanical ADF sheet flag whose position indicates presence or absence of a sheet in the ADF. The scanning module 60 may scan the ADF sheet flag to determine its position and thus detect whether or not a sheet is present in the ADF FIG. 9 shows an example of a mechanical ADF sheet flag 50 which acts as part of an ADF sheet detector. FIG. 9 is a view inside the ADF and to give a clear view some walls and other parts have been excluded so that the flag can be seen clearly. The flag 50 comprises a structure configured to move in response to the presence of one or more sheets in the ADF. In the particular example illustrated, flag 50 is configured to move in response to the presence of one or more sheets upon receiving station 22. Flag 50 is further configured such that movement of flag 50 may be viewed or detected by an image sensor, for example the image scanning module 60. As shown by FIG. 9, in the particular example illustrated, flag 50 includes tab portion 52, intermediate portion 54 and a sensed portion 56. Tab portion 52 comprises a projection which extends through an opening in bottom wall of receiving station 22. For clarity the bottom wall of the receiving station 22 is not shown in FIG. 9, but it is parallel with and above support 22A. Tab portion 52 is configured to be engaged by one or more sheets which are placed upon receiving station 22. Sheets enter the receiving station in the direction shown by the arrow 22B; in the context of the whole image scanner, the arrow 22B is in the direction from right to left of FIG. 4. The tab portion 52 has a cam surface, such that a sheet moving in the direction 22B pushes it down and causes the flag structure including tab portion 52 and connected intermediate portion 54 and sensed portion 56 to pivot or rotate about axis 58 in the direction shown by arrow 59.

Sensed portion 56 comprises a member extending from intermediate portion 54 and is configured to have a range of motion, within a sensing area of the ADF window 16, enabling image scanning module 60 to detect the position or movement of sensed portion 56. In the illustrated example the sensed portion comprises a prong with two feet 56A, 56B. Presence of a sheet in the ADF receiving station rotates the sensed portion from a first position in which both feet can be sensed by the image scanning module to a second position in which only one foot can be sensed by the image scanning module, thus indicating that a sheet is present in the ADF.

It should be noted that the above is only one example. In other examples the ADF sheet flag 50 may have a different shape or configuration. In still other examples the image scanner 60 or another optical sensor may sense the presence of one or more sheets in the ADF directly for example by sensing their presence through one or more openings in a bottom wall of the receiving station 22.

If the ADF sheet detector relies on passage of light between an optical sensor in the main body of the image scanner and the ADF in a lid of the image scanner, then if the passage of light is obscured the ADF sheet detector may not be able to detect whether a sheet is in the ADF receiving station. For example, if a sheet becomes jammed in the ADF then this may obstruct the passage of light. For example, a sheet may have been partially fed through the ADF before becoming stuck in a position which covers the ADF sheet flag 50, in which case the image scanning module 60 will be unable to sense the position of the sheet flag 50. In that case the controller 80 may be configured to generate an ADF jam message—such as a paper jam alert—when the status of the ADF sheet flag 50 cannot be detected.

While this will generate an ADF jam message if a sheet is stuck in the ADF, it may also generate a false ADF jam message in other circumstances. For example, if no sheet is stuck in the ADF, but a large object such as a book is placed on the scan window 14, then the lid 20 cannot be fully closed. As such the scanning module 60 may be unable to scan the ADF sheet flag 50 due to the large air gap between the ADF flag and the scanning module. This may cause the controller to incorrectly determine that a sheet is stuck in the ADF and to generate a false ADF jam message.

This false ADF jam message may be prevented by having a reliable detector for indicating whether or not the lid is open or closed. For example the lid position detector may include a mechanical flag, such as that shown in FIGS. 5A, 5B, 7A, 7B, 8A, 8B etc. In another example the lid position detector may be an electrical switch which detects whether the lid is open or closed, or an optical switch which detects whether the lid is open or closed. For instance, an electrical switch may be closed by having a movable element depressed when the lid is closed; an optical switch may have a light beam between a light source and an optical sensor which is blocked when the lid is closed and free from obstruction when the lid is open, or vice versa.

Figure 10:
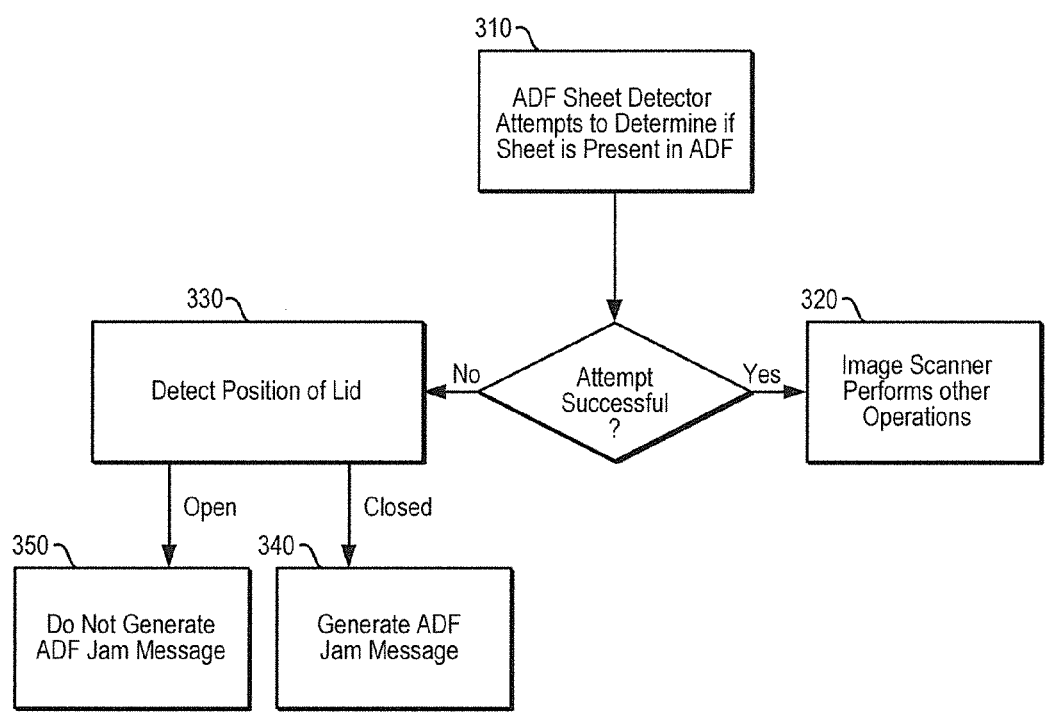
FIG. 10 is a flow diagram showing an example method of generating an ADF jam message.

FIG. 10 shows an example method of determining whether a sheet is stuck in the ADF.

At block 310 the ADF sheet detector attempts to determine whether a sheet is present in the ADF. For example the scanning module 60 attempts to scan the ADF sheet flag 50 to determine its position. If this operation is successful then the image scanner proceeds to perform other functions at block 320.

If the operation is not successful then at block 330 the controller uses the lid position detector to detect the position of the lid 20. If the lid position detector indicates that the lid is closed, then the ADF flag scan failure is likely due to a sheet being stuck in the ADF and the controller generates an ADF jam message at block 340. If the lid position detector indicates that the lid is open, then the failure of the ADF flag scan is likely due to the lid being completely open or partially open due to a book, or other large object, being present on the scan window 14. In that case the controller does not generate an ADF jam message at block 350 and may go on to perform other operations.

Figure 11:
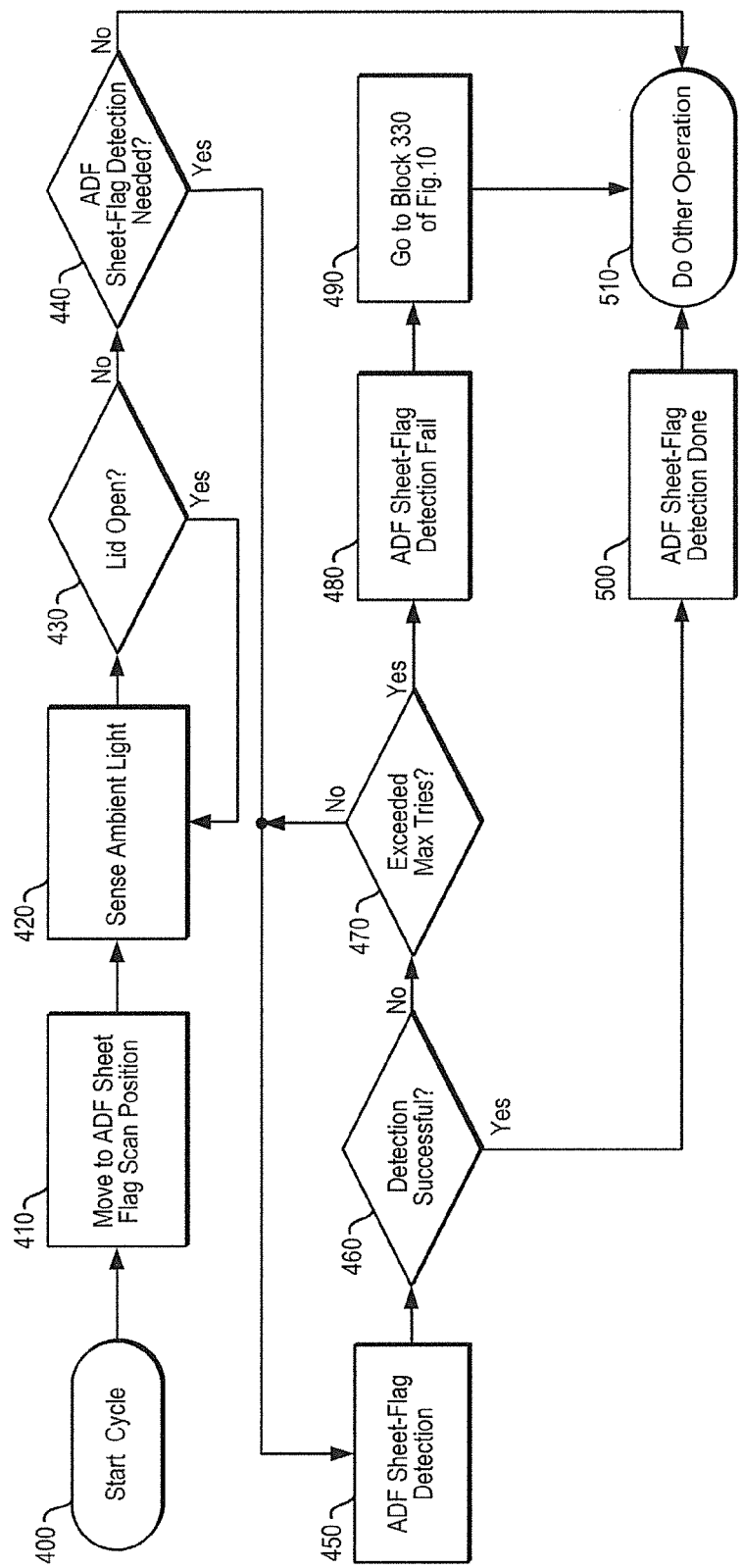
FIG. 11 is a flow diagram of another example method of generating an ADF jam message.

A more detailed example of the operation of the image scanner is shown in FIG. 11.

At 400 the image scanner commences a cycle which may be run periodically when the image scanner is ON but otherwise idle.

At 410 the scanning module moves to an ADF sheet flag scanning position. For example to a position beneath the ADF sheet flag, such as beneath window 16 and position 26 in FIG. 4.

At 420 the scanning modules senses the level of ambient light and makes an initial determination 430 as to whether the lid 20 is open or closed. If the level of ambient light is high such that the determination is that the lid 20 is open, the measurement is repeated periodically until the ambient light is less and the determination is that the lid 20 is closed. Note that this initial determination is not 100% accurate as a dark office, image scanner being under a desk, or a lid being only partially closed due a book or other large object being on the flat bed scan window may be result in an incorrect initial assessment that the lid 20 is closed.

At 440 the controller determines whether it is necessary to detect the status of the ADF sheet detector. For example, this may be necessary if the status has not been successfully checked recently or if there is a recent change in the lid position according to the ambient light detection at block 420. The status of the ADF detector may for instance be checked by scanning an ADF sheet flag to determine its position.

If no detection is needed then the image scanner proceeds to other operations at 510.

If the status of ADF sheet flag needs to be checked then the detection is carried out at block 450.

At block 460 if the ADF sheet flag detection is successful then the controller is notified that the detection is successful at block 500 and the image scanner proceeds to other tasks, such as scanning, at block 510.

If however at block 460 detection of the ADF sheet flag position is not successful, then the detection is attempted again, until a predetermined maximum number of tries or maximum time has been exceed at block 470, in which case the controller determines that the ADF sheet flag detection has failed at block 480. If the ADF sheet flag detection has failed, then at block 490 the method flow proceeds to block 330 of FIG. 10 and the controller uses the lid position detector to determine whether or not the lid is closed. The lid position detector may for example be a mechanical flag whose position is determined by the scanning module or may be an optical or electrical switch whose state is changed by the lid being open or closed. As shown in FIG. 10, if the lid detector indicates that the lid is closed, then at block 340 an ADF jam message is generated. However, if the lid position detector indicates that the lid is open, or partially open due e.g. to the presence of a book or other large object on the flatbed scan window 14, then no ADF jam message is generated at block 350. In this case the image scanner may proceed to other tasks at block 510 of FIG. 11, such as performing a flatbed scan operation.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An image scanner comprising:
    a main body, a lid, a lid position detector, and an optical sensor;
    the main body includes a scan window; wherein;
    the lid is to move between a closed position covering the scan window and open position in which the scan window is exposed;
    the lid position detector includes a mechanical flag that is to move between a first position when the lid is open and a second position when the lid is closed, wherein the mechanical flag comprises a first leg that is in contact with a transparent surface when the flag is in the first position and a second leg that is in contact with the transparent surface when the flag is in the second position, wherein
    the lid comprises an actuator to move the mechanical flag from the second position to the first position when the lid is dosed, and wherein the optical sensor is to optically detect the mechanical flag to determine whether the mechanical flag is in the first or the second position; and
    wherein the optical sensor is on an image scanning module of the image scanner, wherein the optical sensor is to scan an object on the scan window as the image scanning module is moved across the scan window and wherein the image scanner is to determine whether the mechanical flag is in the first or the second position based on a scanned image of the mechanical flag by the optical sensor according to whether the first or second leg is in contact with the transparent surface.

2. The image scanner of claim 1, wherein said optical sensor is to both detect whether the mechanical flag is in the first or second position and to scan documents placed on the scan window.

3. The image scanner of claim 1 wherein the mechanical flag is biased into the first position.

4. The image scanner of claim 1 wherein the mechanical flag is pivotable between the first and second positions.

5. An image scanner comprising:
    a main body including a scan window and a lid covering the scan window, wherein the lid is to move between being opened and closed to selectively expose the scan window;
    a lid position detector including a mechanical flag in the main body of the image scanner, the mechanical flag being movable by closure of the lid from a first position indicating that the lid is open to a second position indicating that the lid is closed, wherein the mechanical flag is pivotable between the first and second positions and wherein the mechanical flag has a leg that is in contact with a transparent surface when the mechanical flag is in one of the first and second positions and wherein the optical sensor is to detect when said leg is in contact with the transparent surface; and an optical sensor to optically detect the mechanical flag, wherein the optical detection of the mechanical flag is used to determine whether the mechanical flag is in the first or the second position.

6. The image scanner of claim 5 wherein the lid includes an actuator to move the mechanical flag from the first position to the second position when the lid is closed.

7. The image scanner of claim 5, wherein the optical sensor is provided in an image scanning module of the image scanner, wherein the image scanning module is to move across the scan window, and wherein the optical sensor is to optically scan a document placed on the scan window.

8. The image scanner of claim 5 wherein the lid includes an automatic document feeder.

9. The image scanner of claim 5, were the flag has a first leg that is in contact with a transparent surface when the flag is the first position as second leg that is in contact with the transparent surface when the flag is in the second position; wherein the optical sensor is to detect whether the first or second leg is in contact with the transparent surface to determine whether the mechanical flap is in the first or the second position.

10. An image scanner comprising:
a main body;
a scan window in the main body;
a lid including an automatic document feeder (ADF) positioned on the main body; the lid being movable between a closed position that covers the scan window and an open position that exposes the scan window;
an ADF sheet detector that indicates whether a sheet is present in the ADF;
a lid position detector having a mechanical flag and an optical sensor, wherein the mechanical flag is to move between a first position when the lid is in the open position and a second position when the lid is in the closed position, and wherein the mechanical flag has as leg that is in contact with a transparent surface when the mechanical flag is in one of the first and second positions and wherein the optical sensor is to detect when said leg is in contact with the transparent surface;
and a controller to trigger an ADF jam message if the status of the ADF sheet detector cannot be determined and the lid position detector indicates that the lid is closed and not trigger an ADF jam alert if the lid position detector indicates that the lid is open.

11. The image scanner of claim 10, further comprising an ADF scanning window, wherein the mechanical flag is positioned between the ADF scanning window and the scan window in the main body.

12. The image scanner of claim 10, wherein;
the ADF sheet detector includes an ADF mechanical flag movable between a position indicating that a sheet is present in the ADF and a position indicating that no sheet is present in the ADF;
and the optical sensor is on an image scanning module that is to scan across the mechanical flag and the ADF mechanical flag, wherein the optical sensor is to optically detect the mechanical flag and the ADF mechanical flag, and wherein the optical detection of the mechanical flag and the ADF mechanical flag are to be used to determine the position of the mechanical flag and the position of the ADF mechanical.

13. The image scanner of claim 10, wherein the optical sensor is also to scan an object on the scan window.

14. The image scanner of claim 10, wherein the optical sensor is to detect when said leg is in contact with the transparent surface through optical detection of the leg through the transparent surface.

* * * * *